United States Patent [19]
Yamauchi et al.

[11] Patent Number: 5,898,565
[45] Date of Patent: Apr. 27, 1999

[54] GAS INSULATED SWITCHGEAR APPARATUS

[75] Inventors: Takao Yamauchi; Masazumi Yamamoto; Kiyokazu Torimi; Hiroki Sanuki, all of Tokyo, Japan

[73] Assignee: Mitsubishi Denki Kabushiki Kaisha, Tokyo, Japan

[21] Appl. No.: 08/881,104

[22] Filed: Jun. 24, 1997

[30] Foreign Application Priority Data

Jun. 27, 1996 [JP] Japan .................................. 8-167349

[51] Int. Cl.⁶ .............................. H02B 1/20; H02B 5/06; H02B 1/26; H01H 61/00
[52] U.S. Cl. .......................... 361/612; 337/28; 361/604; 361/605; 361/622; 361/624; 361/631
[58] Field of Search .......................... 337/28; 361/38–40, 361/117, 602, 604–605, 611–621, 600, 601, 622, 624, 631–634

[56] References Cited

U.S. PATENT DOCUMENTS

| | | | |
|---|---|---|---|
| 4,744,002 | 5/1988 | Nakano et al. | 361/341 |
| 4,821,141 | 4/1989 | Torimi et al. | 361/341 |
| 4,837,662 | 6/1989 | Takeuchi et al. | 361/335 |
| 4,967,307 | 10/1990 | Itou et al. | 361/335 |

FOREIGN PATENT DOCUMENTS 6-30525   4/1994   Japan .

*Primary Examiner*—Leo P. Picard
*Assistant Examiner*—Anatoly Vortman
*Attorney, Agent, or Firm*—Burns, Doane, Swecker & Mathis, LLP

[57] ABSTRACT

A gas insulated switchgear apparatus comprising connection conductors connected to a connection portion to breaker side, disconnectors connected to the connection conductors, cable heads connected to the disconnectors, lightning arresters having one end connected between the disconnectors and the cable heads, single phase voltage transformers provided in one of three phases and having one end connected between the disconnectors and the cable heads and a disconnector cylindrical vessel filled with an insulating gas and containing the connection conductors, the disconnectors, the cable heads, the lightning arresters and the single phase voltage transformers therein. The cable heads are disposed so that the axis of the disconnector cylindrical vessel and the axes of the cable heads are parallel. The lightning arresters are disposed so that the axis of the disconnector cylindrical vessel and the axes of the lightning arresters are parallel. The disconnectors are disposed within a space between the cable heads and the lightning arresters, the connection portion is disposed on a side of one end portion of the disconnector cylindrical vessel and the single phase voltage transformers are disposed on a side of the other end portion of the disconnector cylindrical vessel.

8 Claims, 9 Drawing Sheets

5,898,565

GAS INSULATED SWITCHGEAR APPARATUS

BACKGROUND OF THE INVENTION

This invention relates to a three-phase-in-one type gas insulated switchgear apparatus for used in electric power transmission/distribution and reception/distribution and, more particularly, to a three-phase-in-one type gas insulated switchgear apparatus of which single phase voltage transformer is disposed in one phase of three phases.

FIG. 7 is a cross-sectional view of a conventional gas insulated switchgear apparatus such as disclosed in Japanese Patent Publication No. 6-30525. FIG. 8 is a cross-sectional view taken along line VIII—VIII of FIG. 7, where, the hatching for the cross section is omitted. In FIGS. 7 and 8, 1 is breakers, 1a is a breaker vessel, 2 and 3 are grounding switchgears, 4 is a current transformer, 5 is a control box, 6 and 7 are main bus bars, 8 and 9 are disconnectors, 10 are cable heads, 10a are disconnectors, 10b is a connection portion between the breaker vessel 1a and the disconnector vessel 10a, 11 are lightning arresters, 12 is a voltage transformer, 13 are disconnectors, 14 is a grounding switchgear, 15 is a support bed and 16 are cables. $L_1$ is a unit (gas insulated switchgear apparatus) length, $D_1$ is a flange diameter of the disconnector vessel 10a and $H_1$ is a unit height.

Further, in the breaker vessel 1a, the breakers 1 of three phases, grounding switchgears 2, 3 of three phases and the current transformer 4 of three phases are housed. Also, within the breaker vessel 10a, the cable heads 10 of three phases, the lightning arresters 11 of three phases, the single phase voltage transformer 12, the disconnectors 13 of three phases and the grounding switchgears 14 of three phases are accommodated. Further, the cable heads 10, the lightning arresters 11 and the voltage transformer 12 are disposed in parallel in the lower portion of the disconnector vessel 10a. The disconnectors 13 are disposed in the upper portion of the disconnector vessel 10a and the connection portions 10b are disposed in the upper portions of the breaker vessel 1a and the disconnector vessel 10a.

FIG. 9 is a cross sectional view of a conventional gas insulated switchgear apparatus disclosed in a copy of a microfilm of Japanese Utility Model Laid-Open No. 61-126719, for example. In FIG. 9, the structural components are similar to those of the prior art example 1, to that their description is omitted. However, the voltage transformers 12 are disposed one for each of the three phases.

Then, the disconnector vessel 10a accommodates therein the current transformers 4 of three phases, the cable heads 10 of three phases, the lightning arresters 11 of three phases, the voltage transformer 12 of three phases and the disconnectors 13 of three phases. Further, the cable heads 10 and the lightning arresters 11 are disposed in parallel in the lower portion of the disconnector vessel 10a, and the voltage transformers 12 are disposed in the upper portion of the disconnector vessel 10a. The current transformers 4 are disposed in internal contact with the connection portion 10b of the disconnector vessel 10a. The disconnectors 13 are disposed in the middle portion of the disconnector vessel 10a and the connection portion 10b is disposed in the middle portions of the disconnector vessel 10a and the disconnector vessel 10a.

Further, in the conventional gas insulated switchgear apparatus disclosed in a copy of the microfilm of the Japanese Utility Model Laid-Open No. 61-126719, the installation layout of the three phase lightning arresters 11 and the three phase voltage transformer 12 of FIG. 9 are interchanged. More specifically, the cable heads 10 and the voltage transformers 12 are disposed in parallel in the lower portion of the disconnector vessel 10a and the lightning arresters 11 are disposed in the upper portion of the disconnector vessel 10a.

Since the conventional gas insulated switchgear apparatus has the structure as above described, the cable heads 10, the lightning arresters 11, the voltage transformers 12 and the disconnector 13 are accommodated within the single disconnector vessel 10a, the problem of having separate vessel one for each devices is solved, but another problem as will be discussed below was posed.

In the prior art example 1, the cable heads 10, the lightning arresters 11 and the voltage transformers 12 are disposed in parallel In the lower portion of the disconnector vessel 10a, the diameter $D_1$ of the disconnector vessel 10a becomes large and the disconnection of the lightning arresters 11 and the voltage transformers 12 with respect to the current path (for example, the electrical disconnection from the electric path or the mechanical dismounting from the disconnector vessel 10a of the lightning arresters 11 and the voltage transformers 12 upon their withstanding voltage test) is difficult.

In the prior art example 2, when the three phase lightning arresters 11 and the three phase voltage transformers 12 are to be contained within the disconnector vessel 10a, the diameter of the disconnector vessel 10a may be decreased. However, when the three phase lightning arresters 11 or the single phase voltage transformer provided for one of the three phases are to be accommodated within the disconnector vessel 10a, the upper portion of the disconnector vessel 10a has a larger unoccupied space as compared to the lower portion, posing a problem that the diameter of the disconnector vessel 10a is unnecessarily large. Also, since the lightning arresters 11 and the voltage transformers 12 are arranged in the position opposing to each other with the disconnectors 13 interposed therebetween, making it difficult to obtain an easy access to the current path of the lightning arresters 11 and the voltage transformers 12.

SUMMARY OF THE INVENTION

The present invention has been made in order to solve the above-discussed problems and has as its object the provision of a gas insulated switchgear apparatus in which the connection conductors, the cable heads, the single phase voltage transformers and the lightning arresters can be efficiently arranged within the disconnector cylindrical vessel and the cross-sectional area in the plane substantially perpendicular to the axis of the disconnector cylindrical vessel can be made smaller.

Also, the object is to provide a gas insulated switchgear apparatus in which the connection conductors, the cable heads and the lightning arresters can be efficiently arranged within the disconnector cylindrical vessel and the cross-sectional area in the plane substantially perpendicular to the axis of the disconnector cylindrical vessel can be made smaller.

Also, the object is to provide a gas insulated switchgear apparatus which is small in the cross-sectional area in the plane substantially perpendicular to the axis of the disconnector cylindrical vessel and in the length of the gas insulated switchgear apparatus in the direction of from the main bus bar to the disconnector cylindrical vessel and which is small-sized.

Also, the object is to provide a gas insulated switchgear apparatus in which the connection and disconnection of the lightning arresters and the single phase voltage transformers can be easily established with respect to an electric current path defined by the connection conductors, the cable heads and the lightning arresters.

According to the present invention, the gas insulated switchgear apparatus comprises a connection conductor connected to a connection portion to breaker side, a disconnector connected to the connection conductor, a cable head connected to the disconnector, a lightning arrester having one end connected between the disconnector and the cable head, a single phase voltage transformer provided in one of three phases and having one end connected between the disconnector and the cable head and a disconnector cylindrical vessel filled with an insulating gas and containing the connection conductor, the disconnector, the cable head, the lightning arrester and the single phase voltage transformer therein, and is characterized in that the cable head is disposed so that the axis of the disconnector cylindrical vessel and the axis of the cable head are parallel, the lightning arrester is disposed so that the axis of the disconnector cylindrical vessel and the axis of the lightning arrester are parallel, the disconnector is disposed within a space between the cable head and the lightning arrester, the connection portion is disposed on a side of one end portion of the disconnector cylindrical vessel and that the single phase voltage transformer is disposed on a side of the other end portion of the disconnector cylindrical vessel.

Also, the gas insulated switchgear apparatus comprises a breaker cylindrical vessel filled with an insulating gas and containing therein a vertical type breaker connected to a main bus bar, a connection conductor connected to a connection portion to the vertical type breaker at an opposite side of the main bus bar with respect to the breaker cylindrical vessel, a disconnector connected to the connection conductor, a cable head connected to the disconnector, a lightning arrester having one end connected between the disconnector and the cable head, a single phase voltage transformer provided in one of three phases and having one end connected between the disconnector and the cable head and a disconnector cylindrical vessel filled with an insulating gas and containing the connection conductor, the disconnector, the cable head, the lightning arrester and the single phase voltage transformer therein, and is characterized in that the cable head is disposed so that the axis of the disconnector cylindrical vessel and the axis of the cable head are parallel, the lightning arrester is disposed so that the axis of the disconnector cylindrical vessel and the axis of the lightning arrester are parallel, the disconnector is disposed within a space between the cable head and the lightning arrester, the connection portion is disposed on a side of one end portion of the disconnector cylindrical vessel and that the single phase voltage transformer is disposed on a side of the other end portion of the disconnector cylindrical vessel.

Also, the cable head is disposed on a side of one end portion of the disconnector cylindrical vessel and the lightning arrester is disposed on a side of the other end portion.

Also, the lightning arrester of three phases and the single phase voltage transformer are arranged so that the each center of the lightning arrester of three phases and the center of the single phase voltage transformer define a quadrangle in a cross section of the disconnector cylindrical vessel.

Also, the quadrangle defines symmetric triangles with respect to a diagonal line of the quadrangle defined by connecting a center of the arrester and a center of the single phase voltage transformer.

Also, the gas insulated switchgear apparatus comprises a connection conductor connected to a connection portion to breaker side, a disconnector connected to the connection conductor, a cable head connected to the disconnector, a lightning arrester having one end connected between the disconnector and the cable head, and a disconnector cylindrical vessel filled with an insulating gas and containing the connection conductor, the disconnector, the cable head and the lightning arrester therein, and is characterized in that the cable head is disposed so that the axis of the disconnector cylindrical vessel and the axis of the cable head are parallel, the lightning arrester is disposed so that the axis of the disconnector cylindrical vessel and the axis of the lightning arrester are parallel, the disconnector is disposed within a space between the cable head and the lightning arrester, the connection portion is disposed on a side of one end portion of the disconnector cylindrical vessel.

Also, the disconnector cylindrical vessel has a cross-sectional shape of an oval.

Also, the disconnector cylindrical vessel has a dividable structure.

BRIEF DESCRIPTION OF THE DRAWINGS

The present invention will become more readily apparent from the following detailed description of the preferred embodiments of the present invention taken in conjunction with the accompanying drawing, in which.

DESCRIPTION OF THE PREFERRED EMBODIMENT

Embodiment 1

Figure 1:
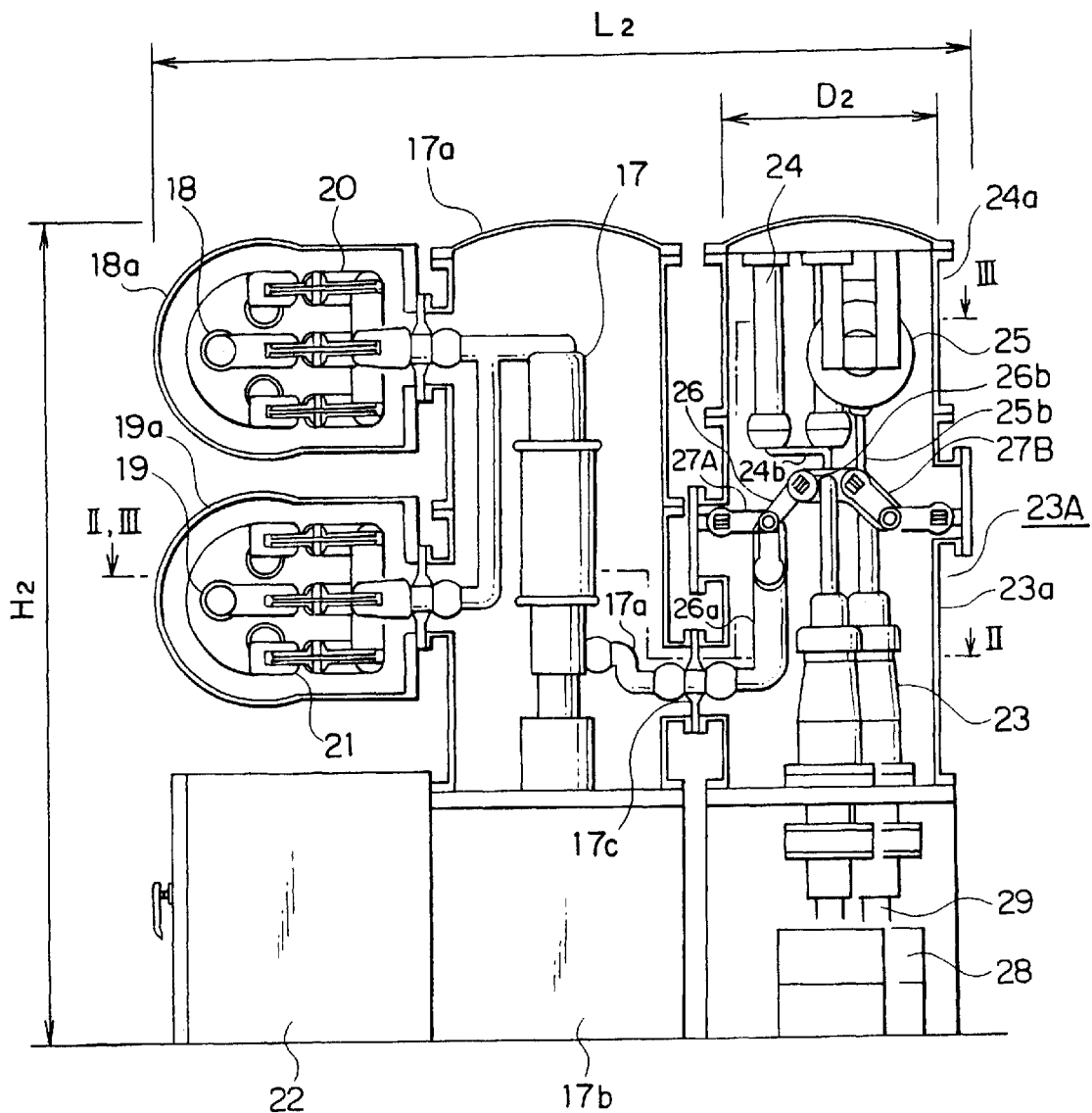
FIG. 1 is a sectional view of the gas insulated switchgear apparatus of the first embodiment of the present invention.
Figure 2:
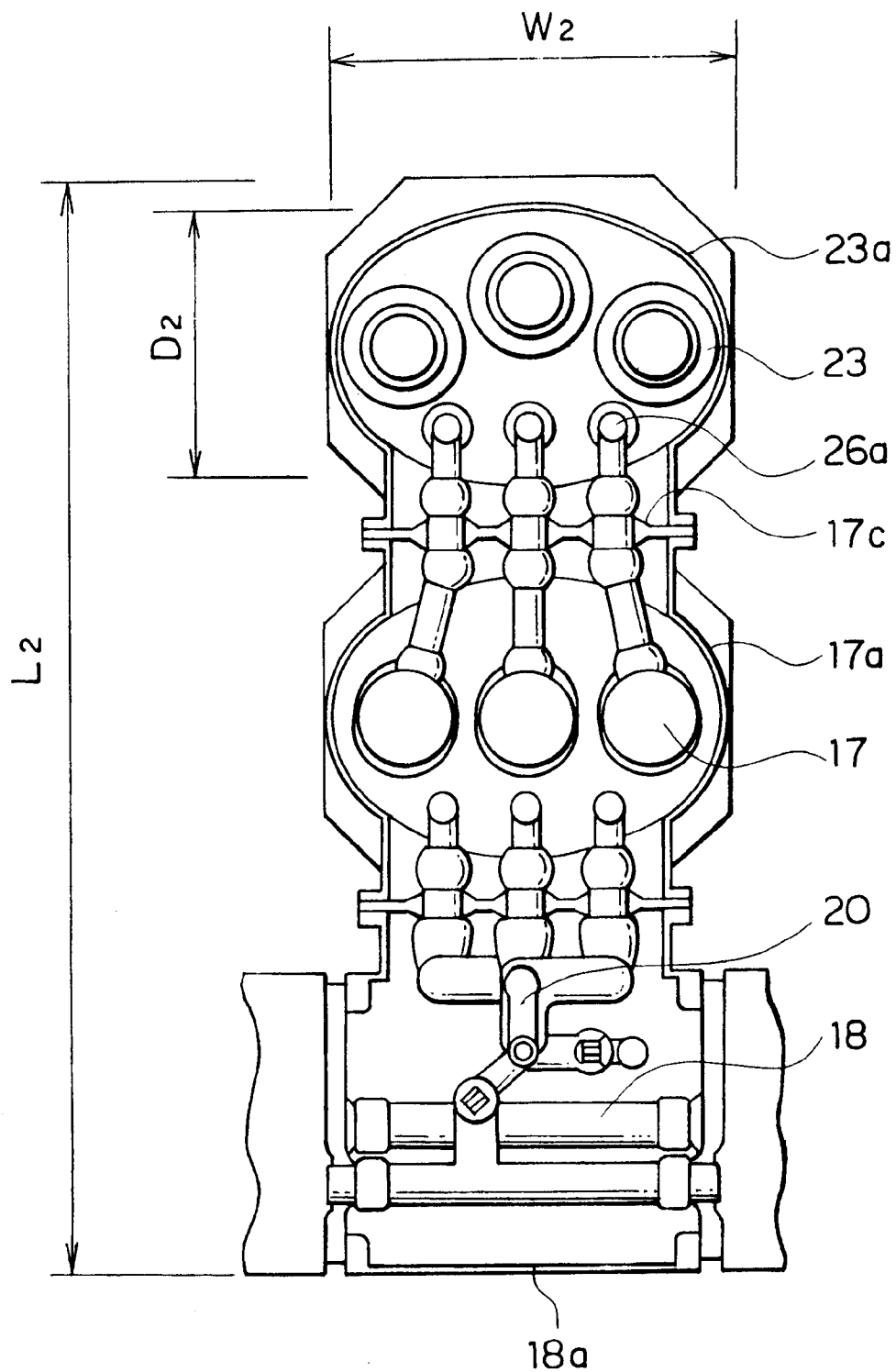
FIG. 2 is a sectional view taken along line II—II of the gas insulated switchgear apparatus shown in FIG. 1.
Figure 3:
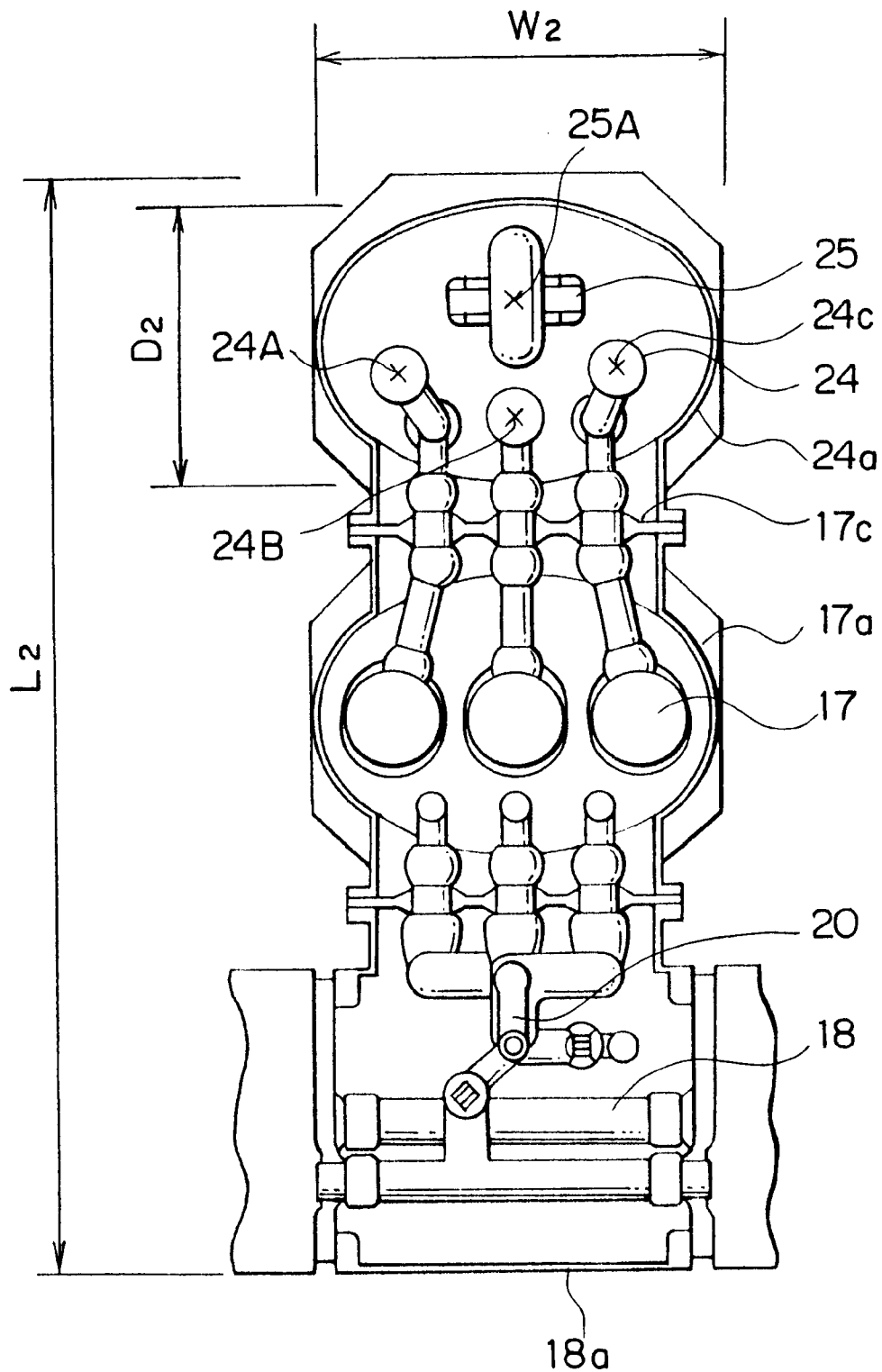
FIG. 3 is a sectional view of the gas insulated switchgear apparatus shown in FIG. 1 taken along line III—III.
Figure 4:
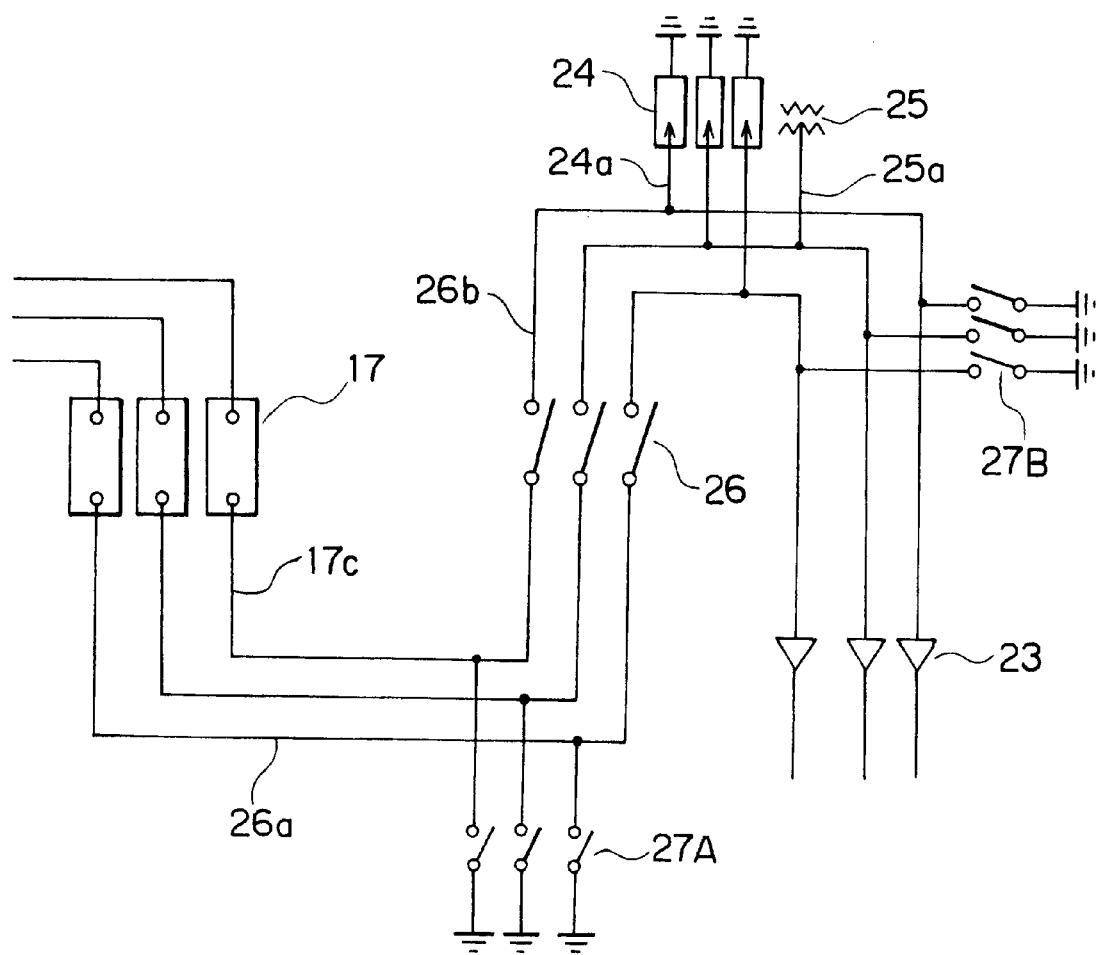
FIG. 4 is a schematic diagram showing the electrical connection of the gas insulated switchgear apparatus shown in FIG. 1.

The description will now be made in terms of the first embodiment of the present invention. FIG. 1 is a sectional view of the gas insulated switchgear apparatus (unit) of the first embodiment of the present invention. FIGS. 2 and 3 are II—II line sectional view and III—III line sectional view of the gas insulated switchgear apparatus shown in FIG. 1. FIG. 4 is a schematic diagram showing the electrical connection between the breakers to the cable heads of the gas insulated switchgear apparatus shown in FIG. 1. However, the hatching designating the sectioned surface is omitted.

In FIGS. 1 to 4, 17 are vertical type breakers, 17a is a breaker vessel which is a breaker cylindrical vessel, 17b is an operation unit control box and 17c is a connection portion to the breaker side and is supported by an insulating spacer. 17d are connection conductors connected to the connection portion 17c, 18 and 19 are main bus bars, 18a and 19a are main bus bar vessels, 20 and 21 are three-point disconnectors, 22 is a control box, 23 are cable heads disposed with its axis in substantially parallel to the axis of the disconnector cylindrical vessel 23A, 23A is a disconnector cylindrical vessel composed of a disconnector lower vessel 23a and a disconnector upper vessel 24a having an oval cross-sectional configuration and flange-connected together, 24 are lightning arresters disposed with their axes in parallel to the axis of the disconnector upper vessel 23A and connected to the conductors 26b through the connection conductors 24b, 25 is a single phase voltage transformer of the winding type provided in one of three phases and connected to the conductors 26b through the connection conductors 24b, 26 are three-point disconnectors, 26a are connection conductors on the movable side of the three-point disconnectors 26 and connected to the connection portions 17c, 26b are conductors on the stationary side of the three-point disconnectors 26, 27A and 27B are grounding switchgears, 28 is a current transformer and 29 are cables. Filled within the breaker vessel 17a, the main bus bar vessels 18a, 19a and the disconnector cylindrical vessel 23A are insulating gas such as $SF_6$ gas. $L_2$ is a unit length, $W_2$ is a longer diameter of the disconnector cylindrical vessel 23A (in this case, equal to the unit width), $H_2$ is a unit height and $D_2$ is a shorter diameter of the disconnector cylindrical vessel 23A.

The arrangement of the inside of the disconnector cylindrical vessel 23A will now be described. Within the disconnector cylindrical vessel 23A, the three phase cable heads 23 and the connection conductors 26a of the three phase disconnectors (three-points disconnectors) 26 are disposed in the lower portion of the disconnector cylindrical vessel 23A, and the disconnector 26 and the grounding switches 27A, 27B are disposed in the middle portion of the disconnector cylindrical vessel 23A or the space between the cable heads 23 and the lightning arresters 24, and the three phase lightning arresters 24 and the single phase voltage transformer 25 are disposed in the upper portion of the disconnector cylindrical vessel 23A.

The disconnector lower vessel 23a which mainly accommodates the disconnectors 26, the cable heads 23 and the connection conductors 26a is connected to the lower portion of the breaker vessel 17a though the oval-shaped insulating spacer. As shown in FIG. 1, the connection portion 17c is disposed at the lower portion of the disconnector cylindrical vessel 23A. The connection conductors 26a are formed into substantially L-shape and disposed so that one of the axes thereof are in a plane perpendicular to the axis of the disconnector cylindrical vessel 23A and that the other of the axes thereof are substantially in parallel to the axis of the disconnector cylindrical vessel 23A. As shown in FIG. 2, within the disconnector lower vessel 23a, the connection conductors 26a are disposed on the side of the breaker vessel 17a, one phase of the cable heads 23 is disposed on the side opposite to the breaker vessel 17a and two other phases of the cable heads 23 are disposed so that their centers are on the longitudinal axis at the cross-sectional plane of the disconnector cylindrical vessel 23A or in its vicinity.

The disconnector upper vessel 24a which mainly accommodates the lightning arresters 24 and the single phase voltage transformer 25 therein is separably connected to the disconnector lower vessel 23a through the flange. Now, the layout of the lightning arresters 24 and the single phase voltage transformer 25 will now be described. In FIG. 3, 24A, 24B, 24C are centers of the respective lightning arresters of three phases at the cross-sectional plane of the disconnector cylindrical vessels 23A, 25A is the center of the single voltage transformer 25 at the cross-sectional plane of the disconnector cylindrical vessel 23A. It is seen that the three phase lightning arresters 24 are disposed on the side of the breaker vessel 17a and the single phase voltage transformer 25 is disposed on the opposite side of the breaker vessel 17a. Also, the lightning arresters 24 and the single phase transformers 25 are disposed such that the centers 24A, 24B, 24C, 25A define a quadrangle and also the substantially symmetrical triangles (a triangle defined by the centers 24A, 24B, 25A and a triangle defined by the centers 24B, 24C, 25A) with react to the diagonal line of the quadrangle connected between the center 24A and the center 25A.

Since the arrangement is as above described, within the upper portion of the disconnector cylindrical vessel 23A, the lightning arresters 24 and the single phase transformer 25 can be more efficiently arranged within the disconnector cylindrical vessel 23A having an oval cross section. Within the lower portion of the disconnector cylindrical vessel 23A. the cable heads 23 and the connection conductors 26a can be more efficiently arranged within the disconnector cylindrical vessel 23A having an oval cross section. Therefore, the larger diameter $W_2$ and the smaller diameter $D_2$ of the disconnector cylindrical vessel 23A can be made small, resulting in a smaller disconnector cylindrical vessel 23A. Also, since the smaller diameter $D_2$ of the disconnector cylindrical vessel 23A can be made smaller, the unit length $L_2$ can be made shorter. Also, even when the unit width is larger than the larger diameter $W_2$., the larger diameter $W_2$ can be made smaller, so that the unit width of course can be made smaller. Further, while the disconnector cylindrical vessel 23A has been described as being of the vertical type, the larger diameter $W_2$ and the smaller diameter $D_2$ of the disconnector cylindrical vessel 23A can be made smaller and the disconnector cylindrical vessel 23A can be made compact even with the horizontal type. In that case, as for the upper portion and the lower portion in the above description, the end portion of the disconnector cylindrical vessel 23A in which the cable heads 23 are disposed is the lover portion and the end portion of the disconnector cylindrical vessel 23A in which the lightning arresters 24 are disposed is the upper portion.

Also, although the breaker vessel 17a has been described as being connected to the disconnector cylindrical vessel 23A through the connection portion 17c, there is a case in which a transformer vessel (not shown) is connected stead of the disconnector cylindrical vessel 23A. In this case, the connection portion 17c is disposed in the lower portion of the breaker vessel 17a and the vertical breakers 17 are electrically connected through the connection portion 17c to the transformers (not shown). Also, in the case of FIG. 1, the arrangement is such that the connection portion 17c is disposed in the lower portion of the disconnector cylindrical vessel 23A. Therefore, the breaker vessel 17a of the identical configuration may be used in either of the transformer vessel or the disconnector cylindrical vessel 23A, the breaker vessel 17a has a high applicability and the manufacturing cost can be decreased. Also, as compared to the disconnector vessel 10a, the height of the disconnector cylindrical vessel 23A shown in FIG. 1 is elongated by the amount corresponding to the lightning arresters 24. However, since the connection portion 17c is disposed in the lower portion of the breaker vessel 17a and the disconnector cylindrical vessel 23A, the structure shown in FIG. 1 enables the cable heads 23 to be located lower than that shown in FIG. 7, allowing the height $H_2$ of the unit to be equal to the unit height $H_1$ of FIG. 7.

Further, since the arrangement is such that the lightning arresters 24 and the single phase voltage transformer 25 are disposed on the same end portion of the disconnector cylindrical vessel 23A, the connection and disconnection of the lightning arresters 24 and the voltage transformers 25 to the conductors 26b (such as, during the withstand voltage test, the lightning arresters 24 and the voltage transformers 25 are electrically isolated from the conductors 26b or dismounted from the disconnector vessel 10a) can be easily achieved.

Further, while the description has been made as to the case where the three phase connection conductors 24b and the connection conductors 25b are separately provided and connected to the conductors 26b as shown in FIG. 4, the arrangement may be such that the conductors 26b are connected in common to one portion of the connection conductors 25b and the one phase connection conductors 24b out of three phases. In this case, since the connection conductors 24b of one phase out of three phases and one portion of the connection conductors 25b can be commonly used, the structure of inside of the disconnector cylindrical vessel 23A can be simplified, allowing the disconnector cylindrical vessel 23A to be small-sized and enabling the easy connection and the separation of the lightning arresters 24 and the voltage transformer 25 with respect to the conductors 26b.

Furthermore, since the disconnector upper vessel 24a and the disconnector lower vessel 23a of the disconnector cylindrical vessel 23A are separably connected through the flange, the assembly and dismounting of the lightning arresters 24 and the voltage transformers 25 can be easily realized and the disconnector cylindrical vessel 23A can be shipped in divided sections.

Embodiment 2

Figure 5:
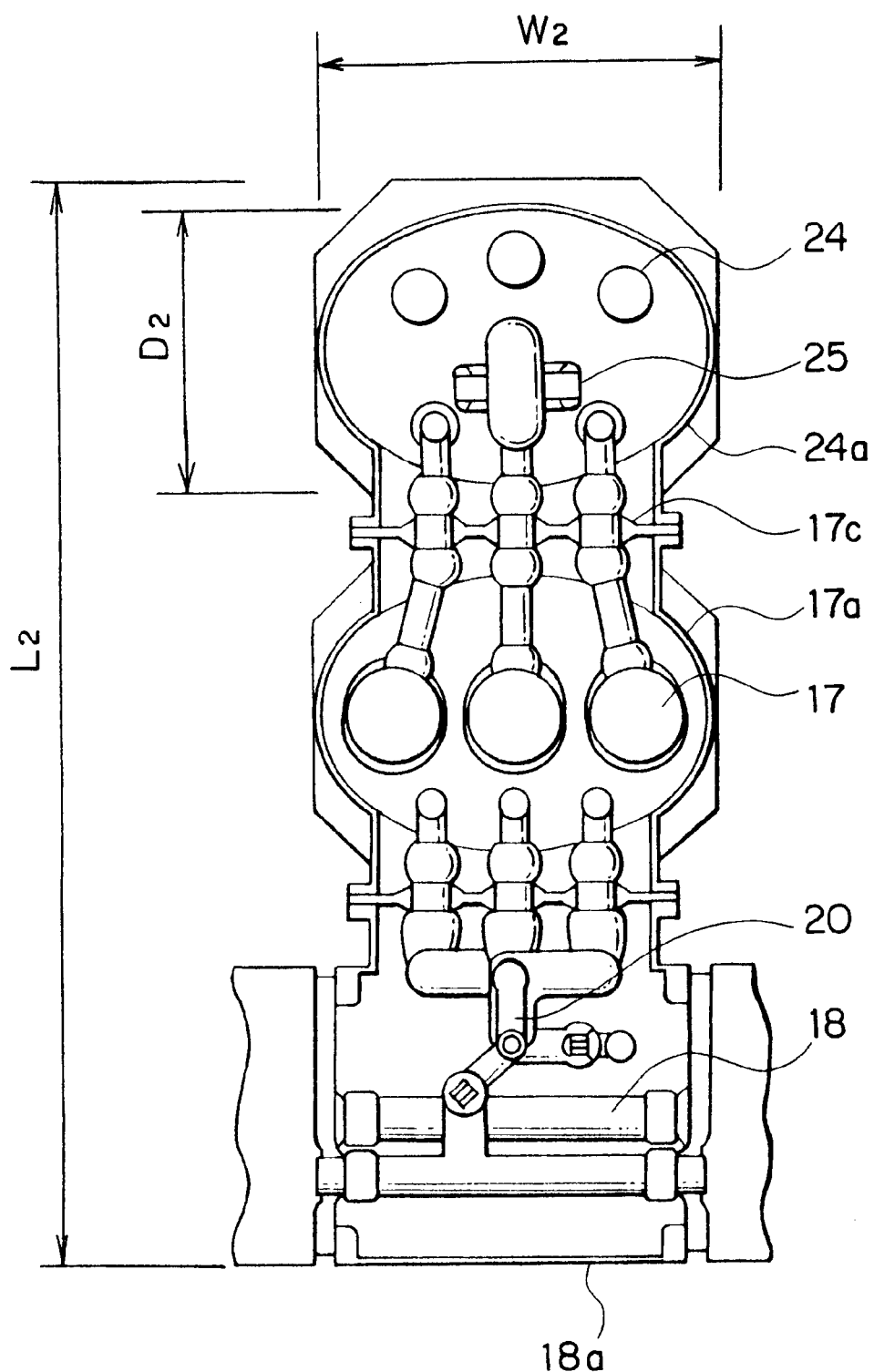
FIG. 5 is a cross-sectional view of the gas insulated switchgear apparatus of the second embodiment of the present invention.

The second embodiment of the present invention will now be described. FIG. 5 is a cross-sectional view of the gas insulated switchgear apparatus of the second embodiment of the present invention. This cross-sectional view illustrates the section taken along the same section as in FIG. 3, although the hatching indicating the cross section is omitted. In FIG. 5, the structural components are similar to those of the first embodiment, so that their explanation will be omitted.

In the first embodiment, the description has been made as to the case where the three phase lightning arresters 24 are disposed on the side of the breaker vessel 17a and where the single voltage transformers 25 are disposed on the opposite side of the breaker vessel 17a. In the second embodiment, as shown in FIG. 5, the three phase lightning arresters 24 are disposed on the opposite side of the breaker vessel 17a and the single phase voltage transformers 25 are disposed on the side of the breaker vessel 17a. With such arrangement, advantageous results additional to those of the first embodiment are that the inspection and maintenance of the lightning arresters 24 are easy because the lightning arresters 24 are disposed on the opposite side to the breaker vessel 17a.

Also, when the connection portion 17c is disposed in the upper portion of the disconnector cylindrical vessel 23A and the connection conductors 26a and the single phase transformers 25 are interchanged in their position, because of the similar reasons to that of the first embodiment, the larger diameter $W_2$ and the smaller diameter $D_2$ of the disconnector cylindrical vessel 23A can be made small, so that the disconnector cylindrical vessel 23A can be made small-sized. Also, since the smaller diameter $D_2$ of the disconnector cylindrical vessel 23A can be made smaller, the unit length $L_2$ can be made smaller.

Embodiment 3

Figure 6:
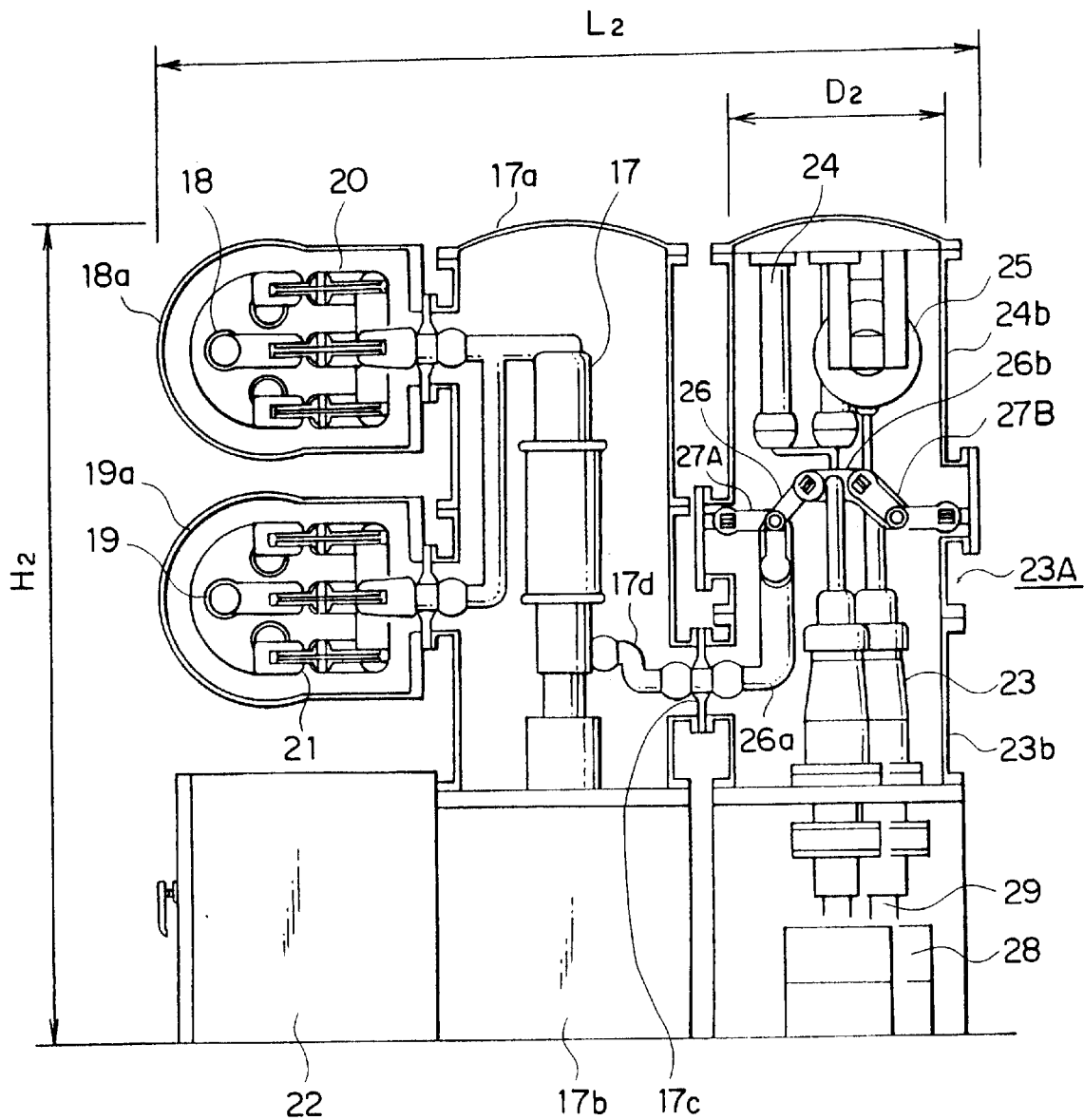
FIG. 6 is a cross-sectional view of the third embodiment of the gas insulated switchgear apparatus of the present invention.

Next, the third embodiment of the present invention will now be described. FIG. 6 is a cross-sectional view of the third embodiment of the gas insulated switchgear apparatus of the present invention, although the hatching indicating the section is being omitted. In FIG. 6, 23A is a disconnector cylindrical vessel having a cross-section of an oval shape and is composed of a disconnector lower vessel 23b and a disconnector upper vessel 24b separably flange-connected together. In other respects, the structural components are similar to that of the first embodiment, so that their description are omitted.

The disconnector lower vessel 23b mainly accommodates the cable heads 23 and the connection conductors 26a, and the disconnector upper vessel 24b mainly accommodates the disconnectors 26, the lightning arresters 24 and the single phase voltage transformers 25.

With such construction, by separating the disconnector lower vessel 23b and the disconnector upper vessel 24b, the inspection and maintenance as well as the assembly and dismounting of the disconnectors 26, the lightning arresters 24 and the single phase voltage transformers 25 can be efficiently achieved.

Here, the disconnector cylindrical vessel 23A may be constructed to have both of the flange-connection portion of the disconnector cylindrical vessel 23A as shown in FIG. 1 as well as the flange-connection portion of the disconnector cylindrical vessel 23A as shown in FIG. 6, i.e., the disconnector cylindrical vessel 23A may be constructed to be dividable into three. In that case, the maintenance and inspection as well as the assembly and the dismounting of the devices to be housed within the disconnector cylindrical vessel 23A can be efficiently achieved and, since the disconnector cylindrical vessel 23A can be divided, they can be transported shipping is easy.

It is to be noted that, while the single phase voltage transformers 25 have been described as being the winding type in the first to the third embodiments, they may equally be a single phase voltage transformer of the capacitor type, electrostatic type of the light type.

Also, while the connection conductors 24b and the connection conductors 25b have been described as being connected to the conductors 26b, they may be connected between the disconnectors 26 and the cable heads 23.

Embodiment 4

Next, the description will be made as to the fourth embodiment of the present invention. The gas insulated switchgear apparatus of the fourth embodiment is the one corresponding to the arrangement of the first to the third embodiments from which the single phase voltage transformers 25 and the connection conductors 25b are omitted. However, the single voltage transformers 25 and the connection conductors 25b are not needed to be accommodate within the disconnector cylindrical vessel 23A. Further, when the connection portion 17c is disposed in the lower portion of the disconnector cylindrical vessel 23A, the cable heads 23 are disposed in the lower portion of the disconnector cylindrical vessel 23A and when the lightning arresters 24 are disposed in the upper portion of the disconnector cylindrical vessel 23A, while the lightning arresters 24 may be similar arrangement to those of the first to the third embodiments, the lightning arresters 24 may be further efficiently arranged in the cross-sectional plane of the disconnector cylindrical vessel 23A. Further, when the connection portion 17c is disposed in the upper portion of the disconnector cylindrical vessel 23A, the cable heads 23 are disposed in the lower portion of the disconnector cylindrical vessel 23A and when the lightning arresters 24 are disposed in the upper portion of the disconnector cylindrical vessel 23A, while the arrangement of the cable heads 23 may be similar to those of the first to the third embodiments, they may be further efficiently arranged at the cross sectional surface of the disconnector cylindrical vessel 23A.

With such arrangement, the lightning arresters 245 can be more efficiently disposed in the upper portion of the disconnector cylindrical vessel 23A within the disconnector cylindrical vessel 23A of the oval cross section. Also, the cable heads 23 and the connection conductors 26a can be more efficiently disposed in the lower portion of the disconnector cylindrical vessel 23A within the disconnector cylindrical vessel 23A of the oval cross section. Therefore, the larger diameter $W_2$ and the smaller diameter $D_2$ of the disconnector cylindrical vessel 23A can be made smaller, allowing the disconnector cylindrical vessel 23A to be small-sized. Also, while the disconnector cylindrical vessel 23A has been described as being the vertical type, the larger diameter $W_2$ and the smaller diameter $D_2$ of the disconnector cylindrical vessel 23A can also be made small in the horizontal type vessel, resulting in a small-sized disconnector cylindrical vessel 23A.

Figure 7:
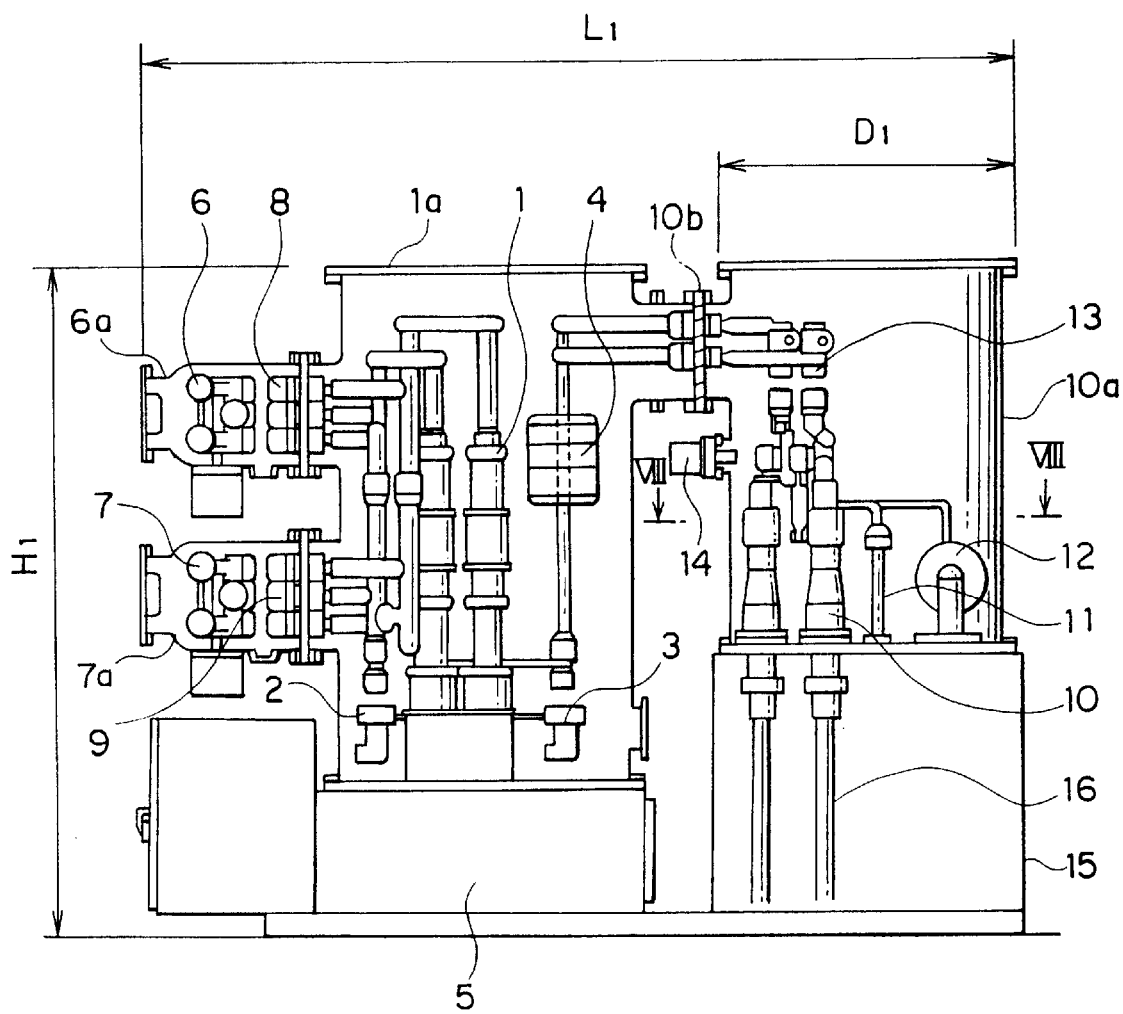
FIG. 7 is a cross-sectional view of a conventional gas insulated switchgear apparatus.
Figure 8:
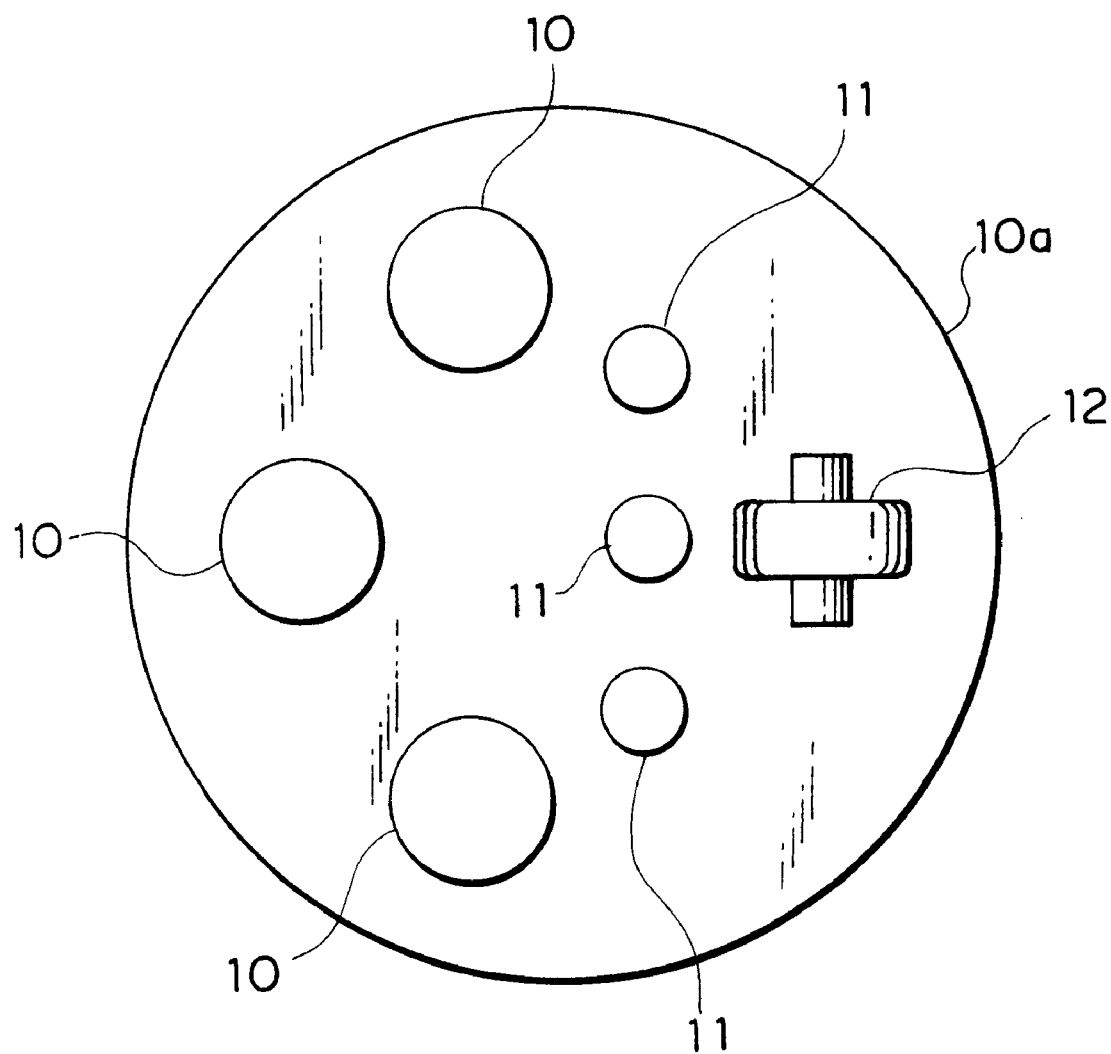
FIG. 8 is a cross-sectional view taken along line VIII—VIII of FIG. 7.
Figure 9:
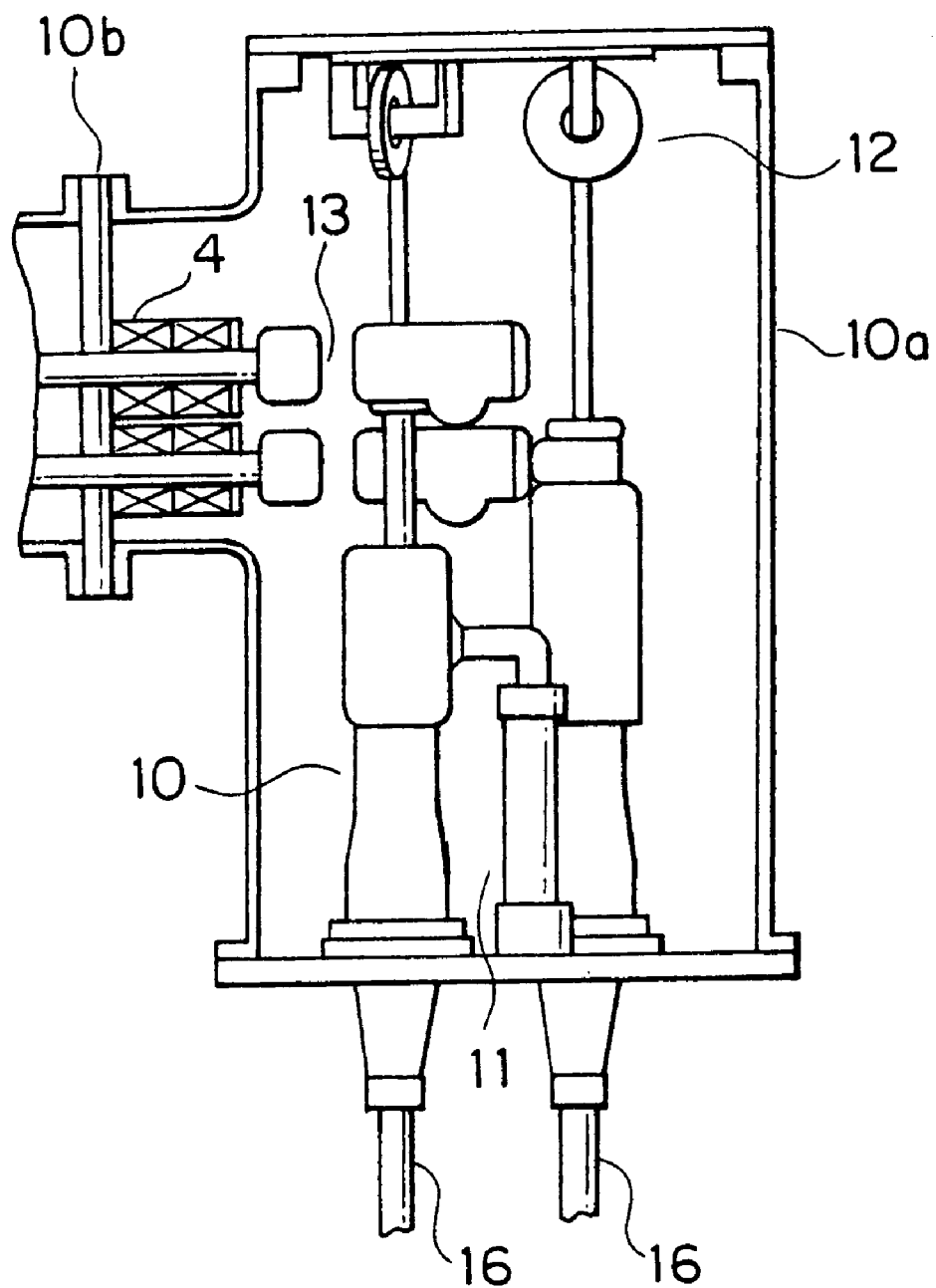
FIG. 9 is a cross-sectional view of a conventional gas insulated switchgear apparatus.

Further, since the connection portion 17c is provided in the lower portion of the breaker vessel 17a and the disconnector cylindrical vessel 23A, the breaker vessel 17a may have the same configuration in either case of the transformer vessel and the disconnector cylindrical vessel 23A, causing the breaker vessel 17a to have a wide applicability and low manufacturing cost and also allowing the unit height $H_2$ to be equal to the unit height $H_1$ shown in FIG. 7.

Also, since the disconnector cylindrical vessel 23A has the disconnector upper vessel 24a and the disconnector lower vessel 23a separably connected by the flange, the assembly and dismantling of the lightning arresters 24 and the voltage transformers 25 can be easily achieved, and the separated disconnector cylindrical vessel 23A can be easily transported.

Furthermore, since the single phase voltage transformer 25 and the connection conductors 25b are not required to be contained within the disconnector cylindrical vessel 23A, the disconnector cylindrical vessel 23A can be further small-sized by providing the connection portion 17c in either one of the cable heads 23 or the lightning arresters 23 which have smaller occupation area within the disconnector cylindrical vessel 23A which is determined by the size and the electrical insulating between the phases.

While the connection conductors 26a of the movable side and the conductors 26b of the stationary side of the three-point disconnectors 26 may be supported by the support insulator, the connection conductors 26a may be supported by the insulating spacers of the connection portion 17c and the conductors 26b may be supported by the connection conductors 24b of the lightning arresters 24. In this case, since the connection conductors 26a and the connection conductors 24b serves also as support members, the structure within the disconnector cylindrical vessel 23A is simple and the disconnector cylindrical vessel 23A can be small-sized.

Also, when the cables 29 are to be disposed in the upper portion of the disconnector cylindrical vessel 23A, the components disposed within the disconnector cylindrical vessel 23A shown in FIG. 1 may be shifted in an upside-down manner.

Further, while the description has been made in terms of the disconnector cylindrical vessel 23A of the oval cross-sectional configuration, another configuration other than oval such as circles, elongated circles, rectangles polygons may equally be employed. However, the arrangement relationship between the lightning arresters 24 and the single phase voltage transformers 25 is determined by the insulating distance between the respective lightning arresters 24 and the single phase voltage transformers 25 and the disconnector cylindrical vessel 23A. Similarly, the arrangement relationship between the connection conductors 26a and the cable heads 23 is determined by the insulating distance between the respective connection conductors 26a and the respective cable heads 23 and the disconnector cylindrical vessel 23A. When the lightning arresters 24, the single phase voltage transformers 25, the connection conductors 26a and the cable heads 23 are to be disposed within the disconnector cylindrical vessel 23A, the area occupied by the lightning arresters 24 and the single phase voltage transformers 25 and the area occupied by the connection conductors 26a and the cable heads 23 are minimized, and in this case, the cross-sectional area of the disconnector cylindrical vessel 23A can be made minimum when the cross-sectional configuration of the disconnector cylindrical vessel 23A is oval. Therefore, the preferred cross-sectional configuration of the disconnector cylindrical vessel 23A is an oval shape. Also, the preferred cross-sectional configuration of the breaker vessel 1a is also an oval shape. Further, with the disconnector cylindrical vessel 23A is a dividable vessel, the respective vessel sections may have different cross-sectional shapes.

The gas insulated switchgear apparatus of the present invention comprises a connection conductor connected to a connection portion to breaker side, a disconnector connected to said connection conductor, a cable head connected to said disconnector, a lightning arrester having one end connected between said disconnector and said cable head, a single phase voltage transformer provided in one of three phases and having one end connected between said disconnector and said cable head and a disconnector cylindrical vessel filled with an insulating gas and containing said connection conductor, said disconnector, said cable head, said lightning arrester and said single phase voltage transformer therein, and is characterized in that said cable head is disposed so that the axis of said disconnector cylindrical vessel and the axis of said cable head are parallel, said lightning arrester is disposed so that the axis of said disconnector cylindrical vessel and the axis of said lightning arrester are parallel, said disconnector is disposed within a space between said cable head and said lightning arrester, said connection portion is disposed on a side of one end portion of said disconnector cylindrical vessel and that said single phase voltage transformer is disposed on a side of the other end portion of said disconnector cylindrical vessel. Therefore, the connection conductors, the cable heads, the single phase voltage transformers and the lightning arresters can be efficiently disposed within the disconnector cylindrical vessel, allowing the cross-sectional area substantially perpendicular to the axis of the disconnector cylindrical vessel to be small.

Also, the gas insulated switchgear apparatus comprises a breaker cylindrical vessel filled with an insulating gas and containing therein a vertical type breaker connected to a main bus bar, a connection conductor connected to a connection portion to said vertical type breaker at an opposite side of said main bus bar with respect to said breaker cylindrical vessel, a disconnector connected to said connection conductor, a cable head connected to said disconnector, a lightning arrester having one end connected between said disconnector and said cable head, a single phase voltage transformer provided in one of three phases and having one end connected between said disconnector and said cable head and a disconnector cylindrical vessel filled with an insulating gas and containing said connection conductor, said disconnector, said cable head, said lightning arrester and said single phase voltage transformer therein, and is characterized in that said cable head is disposed so that the axis of said disconnector cylindrical vessel and the axis of said cable head are parallel, said lightning arrester is disposed so that the axis of said disconnector cylindrical vessel and the axis of said lightning arrester are parallel, said disconnector is disposed within a space between said cable head and said lightning arrester, said connection portion is disposed on a side of one end portion of said disconnector cylindrical vessel and that said single phase voltage transformer is disposed on a side of the other end portion of said disconnector cylindrical vessel. Therefore, the cross-sectional area perpendicular to the axis of the disconnector cylindrical vessel can be made small and the length in the direction of the disconnector cylindrical vessel from the main bus bars of the gas insulated switchgear apparatus can be made small, allowing the gas insulated switchgear to be small-sized.

Also, the cable heads are disposed on a side of one end portion of said disconnector cylindrical vessel and said lightning arresters are disposed on a side of the other end portion. Therefore, the lightning arresters and the single phase voltage transformers can be easily connect and disconnect relative to the current path defined by the connection conductors, the disconnectors and the cable heads.

Also, the lightning arrester of three phases and said single phase voltage transformer are arranged so that the each center of said lightning arrester of three phases and the center of said single phase voltage transformer define a quadrangle in a cross section of said disconnector cylindrical vessel. Therefore, the area occupied by the lightning arresters and the single phase voltage transformers and substantially perpendicular to the axis of the disconnector vessel can be made small, making the disconnector cylindrical vessel small-sized.

Also, the quadrangle defines symmetric triangles with respect to a diagonal line of said quadrangle defined by connecting a center of said arrester and a center of said single phase voltage transformer. Therefore, the area occupied by the lightning arresters and the single phase voltage transformers and substantially perpendicular to the axis of the disconnector vessel can be made small, making the disconnector cylindrical vessel small-sized.

Also, the gas insulated switchgear apparatus of the present invention comprises a connection conductor connected to a connection portion to breaker side, a disconnector connected to said connection conductor, a cable head connected to said disconnector, a lightning arrester having one end connected between said disconnector and said cable head, and a disconnector cylindrical vessel filled with an insulating gas and containing said connection conductor, said disconnector, said cable head and said lightning arrester therein, and is characterized in that said cable head is disposed so that the axis of said disconnector cylindrical vessel and the axis of said cable head are parallel, said lightning arrester is disposed so that the axis of said disconnector cylindrical vessel and the axis of said lightning arrester are parallel, said disconnector is disposed within a space between said cable head and said lightning arrester, said connection portion is disposed on a side of one end portion of said disconnector cylindrical vessel. Therefore, the connection conductors, the cable heads and the lightning arresters can be efficiently disposed within the disconnector cylindrical vessel, allowing the cross-sectional area substantially perpendicular to the axis of the disconnector cylindrical vessel to be small.

Also, the disconnector cylindrical vessel has a cross-sectional shape of an oval. Therefore, the cross-sectional area substantially perpendicular to the axis of the disconnector vessel can be made small, making the disconnector cylindrical vessel further small-sized.

Also, the disconnector cylindrical vessel has a dividable structure. Therefore, the assembly and disassembly of the lightning arresters can be achieved at high efficiency and the transportation of the disconnector cylindrical vessel is easy.

What is claimed is:

1. A gas insulated switchgear apparatus comprising:

a connector portion;

connection conductors connected to said connection portion to breaker side;

disconnectors connected to said connection conductors;

cable heads connected to said disconnectors;

lightning arresters each connected to both said disconnectors and said cable heads;

a single phase voltage transformer provided in one of three phases and having one end connected to both said disconnectors and said cable heads; and a disconnector cylindrical vessel filled with an insulating gas and containing said connection conductors, said disconnectors, said cable heads, said lightning arresters and said single phase voltage transformer therein;

wherein said cable heads are disposed so that the axis of said disconnector cylindrical vessel and the axes of said cable heads are parallel, said lightning arresters are disposed so that the axis of said disconnector cylindrical vessel and the axes of said lightning arresters are parallel, said disconnectors are disposed within a space between said cable heads and said lightning arresters, said connection portion is disposed on a side of one end portion of said disconnector cylindrical vessel, and said single phase voltage transformer is disposed on a side of the other end portion of said disconnector cylindrical vessel.

2. A gas insulated switchgear apparatus comprising:

main bus bars;

vertical type breakers connected to said main bus bars;

a breaker cylindrical vessel filled with an insulating gas and containing therein said vertical type breakers connected to said main bus bars;

a connection portion;

connection conductors connected to said connection portion and to said vertical type breakers at an opposite side of said main bus bars with respect to said breaker cylindrical vessel;

disconnectors connected to said connection conductors;

cable heads connected to said disconnectors; lightning arresters having one end connected to both said disconnectors and said cable heads;

a single phase voltage transformer provided in one of three phases and having one end connected to both said disconnectors and said cable heads and a disconnector cylindrical vessel filled with an insulating gas and containing said connection conductors, said disconnectors, said cable, heads, said lightning arresters and said single phase voltage transformer therein;

wherein said cable heads are disposed so that the axis of said disconnector cylindrical vessel and the axes of said cable heads are parallel, said lightning arresters are disposed so that the axis of said disconnector cylindrical vessel and the axes of said lightning arresters are parallel, said disconnectors are disposed within a space between said cable heads and said lightning arresters, said connection portion is disposed on a side of one end portion of said disconnector cylindrical vessels and said single phase voltage transformer is disposed on a side of the other end portion of said disconnector cylindrical vessel.

3. A gas insulated switchgear apparatus as claimed in claim 1, wherein said cable heads are disposed on a side of one end portion of said disconnector cylindrical vessel and said lightning arresters are disposed on a side of the other end portion.

4. A gas insulated switchgear apparatus as claimed in claim 3, wherein said lightning arresters of three phases and said single phase voltage transformer are arranged so that the each center of said lightning arresters of three phases and the center of said single phase voltage transformer define a quadrangle in a cross section of said disconnector cylindrical vessel.

5. A gas insulated switchgear apparatus as claimed in claim 4, wherein said quadrangle defines symmetric triangles with respect to a diagonal line of said quadrangle defined by connecting centers of said arresters and centers of said single phase voltage transformers.

6. A gas insulated switchgear apparatus comprising:

a connection portion;

connection conductor connected to said connection portion to breaker side;

disconnectors connected to said connection conductors;

cable heads connected to said disconnectors;

lightning arresters having one end connected to both said disconnectors and said cable heads; and a disconnector cylindrical vessel filled with an insulating gas and containing said connection conductors, said disconnectors, said cable heads and said lightning arresters therein;

wherein said cable heads are disposed so that the axis of said disconnector cylindrical vessel and the axes of said cable heads are parallel, said lightning arresters are disposed so that the axis of said disconnector cylindrical vessel and the axes of said lightning arresters are parallel, said disconnectors are disposed within a space between said cable heads and said lightning arresters, and said connection portion is disposed on a side of one end portion of said disconnector cylindrical vessel.

7. A gas insulated switchgear apparatus as claimed in claim 1, wherein said disconnector cylindrical vessel has a cross-sectional shape of an oval.

8. A gas insulated switchgear apparatus as claimed in claim 1, wherein said disconnector cylindrical vessel has a dividable structure.

* * * * *